May 2, 1939.　　　　G. D. FROM　　　　2,156,977
AUTOMATIC STEERING MEANS FOR TRACTORS
Filed March 27, 1937
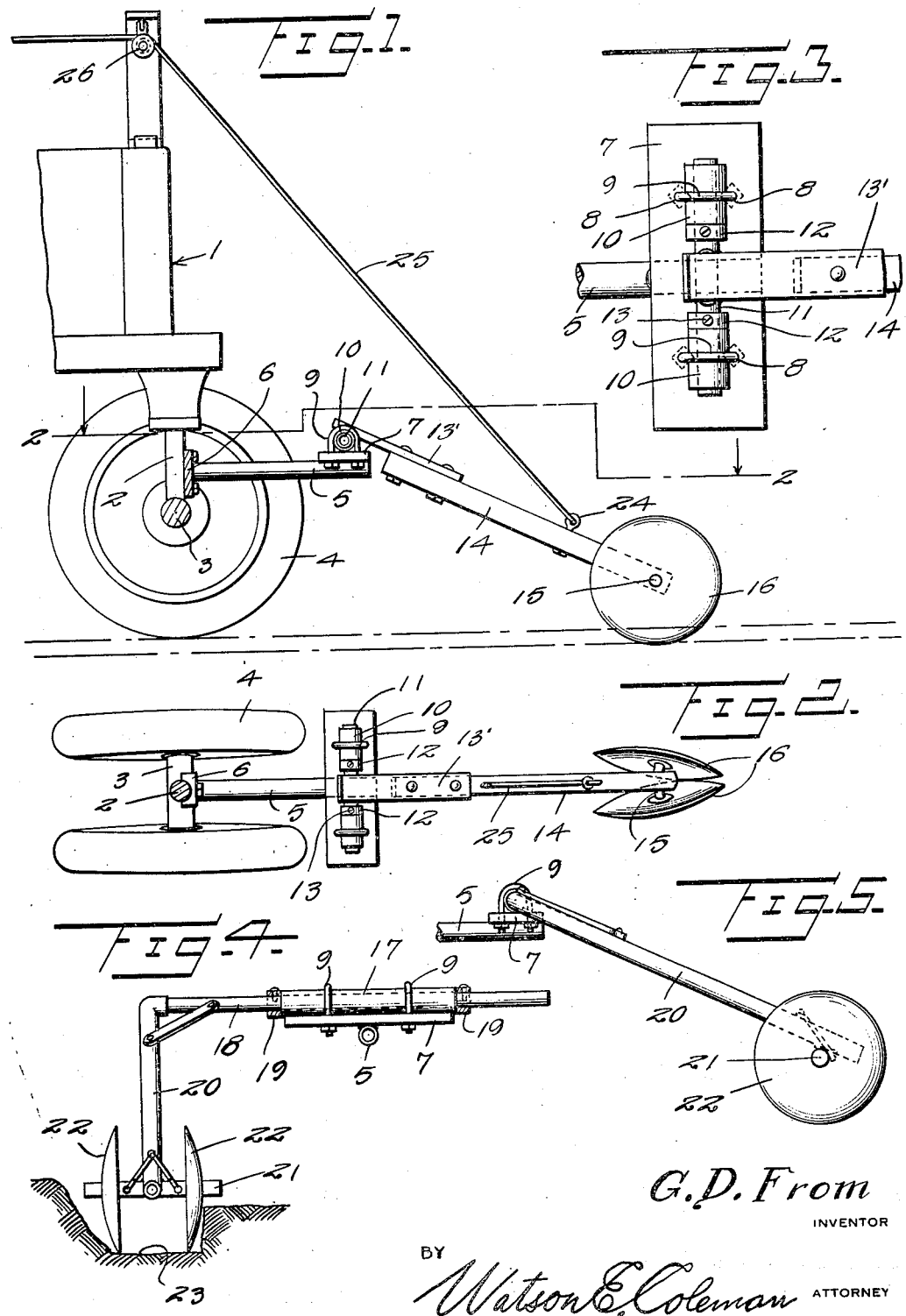
G. D. From
INVENTOR
BY Watson E. Coleman ATTORNEY Patented May 2, 1939

2,156,977

UNITED STATES PATENT OFFICE 2,156,977

AUTOMATIC STEERING MEANS FOR TRACTORS

Guy D. From, David City, Nebr.

Application March 27, 1937, Serial No. 133,430

5 Claims. (Cl. 97—49)

This invention relates to agricultural implements and pertains particularly to improvements in automatic guiding means for tractors.

The present invention has for its primary object to provide a guiding means for farm tractors which is so designed that it will operate to properly steer or guide the tractor where a very shallow guiding groove or mark is formed in the earth such as is customarily made by the ordinary disc marker used in planting row crops or drilling small grain.

Another object of the invention is to provide a tractor guide or steering device which is so designed that it may be placed directly in front of the tractor whereby a long lever arm may be employed to obtain a maximum steering leverage with a relatively light contact with the sides of a groove formed in the earth.

A still further object of the invention is to provide a steering device for tractors which is so designed that a lateral steering arm may be used in place of a forwardly extending arm so that the tractor may be guided by means of a previously formed laterally disposed plow furrow or thru contact with the earth ridge when listed corn is being cultivated.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing

Figure 1 is a view in side elevation of one form of the device showing the same applied.

Fig. 2 is a section on the line 2—2 of Fig. 1.

Fig. 3 is a view in plan of the pivot coupling on an enlarged scale.

Fig. 4 is a view in front elevation of a modified form.

Fig. 5 is a view in side elevation of the same.

Referring now more particularly to the drawing, the numeral 1 generally designates a conventionally illustrated radiator for a farm tractor of the type having at its front a vertical steering post 2, to the lower end of which is fixed a short transverse axle unit 3 which carries a pair of front steering wheels 4 which are arranged in the usual inclined relation. No detailed steering means is shown in association with the steering post 2, as such structure is well known and forms no part of the present invention.

The device embodying the present invention consists of a fixed arm 5 which at one end is secured in any suitable manner, as indicated at 6, to the oscillatable steering post 2 through the medium of which the steering wheels 4 are turned about a vertical axis. This forwardly extending arm 5 has secured to its outer or forward end the transverse plate 7 which is preferably of flat material, and adjacent each end this transverse plate has a pair of spaced openings 8 formed for the reception of the legs of a U-bolt 9. The plate 7 forms a fixed element of a hinge unit and the U-bolts 9 secure to the plate 7, in one form of the invention, the alined sleeves 10.

Extending longitudinally of the plate 7 is a hinge axle 11 which has its ends extended into the adjacent sleeves 10 and adjacent the inner end of each sleeve this axle has secured thereto a movement limiting collar 12 which is retained in position by the set screw 13. The hinge axle 11 is thus permitted oscillatory motion in the sleeves 10, but has its longitudinal movement therein limited.

Fixed to the central part of the hinge axle 11 is one end of a coupling bar 13' which has its other end secured to the rear end of the movable steering arm 14 which normally extends forwardly from the rear fixed arm 5 and in the same vertical plane therewith. At its forward end the arm 14 carries the laterally extending and downwardly diverging stub axles 15, each of which carries a disc 16 and, as shown, these discs are in convergent relation so that they will come together where they contact with the ground. With this arrangement, the arms 5 and 14 may be of substantial length, preferably about six feet, and thus when the convergent edges of the guide discs 16 are engaged in a groove in the earth, a very slight lateral movement imparted to the discs by the groove, will cause a relatively strong turning leverage to be applied to the tractor steering post 2 and thus will bring about the turning of the steering wheels in the proper direction to make the tractor follow the groove in which the guide discs are engaged.

By reason of the hinge connection between the arms 5 and 14, the discs will be permitted to move in a vertical plane so as to pass over obstructions or follow inequalities in the surface of the ground without becoming displaced from the guiding groove.

In Figs. 4 and 5, there is shown a slight modification of the steering mechanism described, which modified form is designed to facilitate the guiding of the tractor along a path paralleling a laterally disposed plow furrow. In this form of the invention, the sleeves 10 are replaced by a single hinge sleeve 17 which rests upon the plate 7 and is secured at its two ends by the U-bolts 9. Extending into this sleeve from one end is a laterally projecting hinge axle 18 which carries a pair of adjustably mounted collars 19 between which the sleeve 17 is disposed so that the longitudinal movement of the hinge shaft will be limited.

The axle 18 extends at one end a substantial distance beyond the adjacent end of the sleeve 17 and has secured thereto a downwardly extending forwardly directed arm extension 20 which at its lower end carries the laterally directed stub shafts 21 upon each of which a guiding disc 22 is rotatably mounted. These discs are preferably disposed in parallel vertical planes and are designed to position in a plow furrow 23 so that each disc will engage one side of the furrow and as the furrow curves the discs will engage the side walls thereof and follow the curvature and effect the lateral movement of a fixed steering arm 5 and the consequent turning of the steering wheel carrying post 2.

In order that the guiding wheels or discs 16 may be controlled by the operator of the tractor, the arm 14 may be provided with an eye 24 or other suitable means to facilitate the attachment to this arm of a cable 25 which passes rearwardly over a suitable bracket supported pulley 26 mounted on the radiator, to the seat of the driver. By this means the discs may be lifted from the ground when the services of the same are no longer desired. A similar lifting arrangement may be employed in association with the extension 20 of the hinge axle 18 whereby the discs 22 may be raised as may be found necessary.

From the foregoing it will be readily apparent that the mechanism embodying the present invention is of extremely simple construction but will operate effectively to control a tractor having a front end construction of the character illustrated and described, and it will also be apparent that with this device the tractor may be made to follow the ground mark of a disc marker, whereas other similar devices will not do so because of the fact that they require a deeper groove or channel in order to get the required leverage for turning the steering mechanism.

It will also be apparent that the device may be easily and quickly changed for use in following a disc marker formed groove or for following a plow furrow.

While the illustration of the means for raising the ground engaging discs has been shown as passing over the right side of the motor vehicle radiator, it is to be understood that this cable and pulley supporting bracket may be mounted upon either side in accordance with the wishes and to suit the convenience of the operator of the vehicle. In addition, the device illustrated in Figs. 4 and 5 may be reversed so as to follow a furrow at the left side of the vehicle instead of at the right, as the device is now shown to be used.

What I claim, is:

1. Steering means for a wheeled vehicle having a vertical steering post, comprising a rigid bar secured at one end to the post to extend therefrom forwardly with respect to the vehicle, a plate secured across the forward end of said bar, a sleeve secured to said plate and disposed transversely of the bar, a hinge axle oscillatably mounted in said sleeve, a bar secured at one end to said hinge axle, and a ground furrow engaging wheel rotatably secured to the other end of said bar said axle permitting vertical oscillation of the bar.

2. Steering means for a wheeled vehicle having a vertical steering post, comprising a bar secured at one end to the post to extend rigidly forwardly therefrom and with respect to the vehicle, a hinge unit comprising a plate secured to and transversely of the other end of the bar, a sleeve detachably secured to one side of said plate to extend longitudinally thereof and transversely of said bar, a hinge axle oscillatably mounted in said sleeve, a bar secured at one end to said axle, to move vertically upon oscillation of the axle, and a pair of disc members rotatably mounted upon the other end of said last bar and disposed in downwardly convergent relation for engagement in a ground groove.

3. Steering means for a wheeled vehicle having a vertical steering post, comprising a bar secured at one end to the post to extend rigidly therefrom forwardly with respect to the vehicle, a hinge unit comprising a plate secured to and transversely of the other end of the bar, a pair of hinge sleeves disposed in spaced axial alinement upon said plate and detachably secured thereto, a hinge axle having its ends in said sleeves, a bar secured at one end to said axle, and a pair of disc members rotatably mounted upon the other end of said last bar and arranged in downwardly divergent relation for engagement in a ground groove, said hinge unit, sleeves and axle facilitating the oscillation of said last bar in a vertical plane.

4. Steering means for a wheeled vehicle having a vertical steering post, comprising a bar secured at one end to the post to extend rigidly therefrom forwardly with respect to the vehicle, a hinge unit comprising a plate secured to and transversely of th other end of the bar, a hinge sleeve secured to said plate, a hinge axle oscillatably disposed in the sleeve and extending at one end a substantial distance beyond the adjacent end of the sleeve, an arm secured at one end to the extended end of the axle and arranged in rightangular relation therewith, and a pair of ground engaging wheels carried by said arm said axle being oscillatable on a horizontal axis whereby said wheels may be raised from the ground.

5. Steering means for a wheeled vehicle having a vertical steering post, comprising a bar secured at one end to the post to extend rigidly forwardly therefrom with respect to the vehicle, a plate secured to and transversely of the forward end of said bar, a sleeve extending longitudinally of and resting upon the top face of said plate, a U-bolt straddling said sleeve and extending downwardly through the plate and secured to the latter to maintain said sleeve rigidly in position thereon, an axle extending through said sleeve, means carried by the axle and engaging an end of the sleeve to limit movement of the axle through the sleeve, an arm coupled at one end with said axle and extending forwardly and downwardly therefrom, and means carried by said arm from the forward end for engagement in a guide groove in the ground, said arm being vertically oscillatable and said axle being turnable in the sleeve.

GUY D. FROM.